Figure 1:
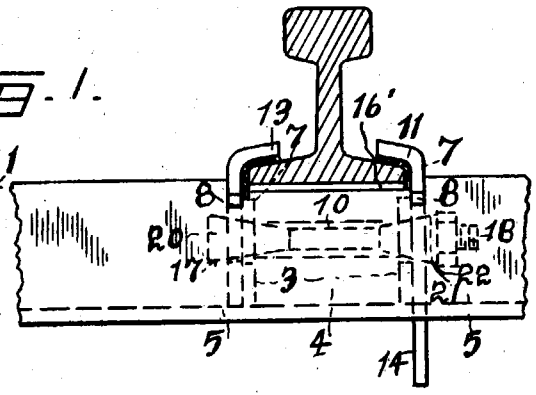

B. S. RUPP & J. W. JOHNSON.

METALLIC TIE.

APPLICATION FILED MAY 31, 1912.

Reissued May 12, 1914.

13,729.

3 SHEETS—SHEET 1.

Inventors

Burton S. Rupp

Jesse W. Johnson

Witnesses

M. C. Taylor

L. Jordon.

By Harrison & Drew Attorney

COLUMBIA PLANOGRAPH CO., WASHINGTON, D. C.

B. S. RUPP & J. W. JOHNSON.
METALLIC TIE.
APPLICATION FILED MAY 31, 1912.
Reissued May 12, 1914. 13,729.
3 SHEETS—SHEET 2.
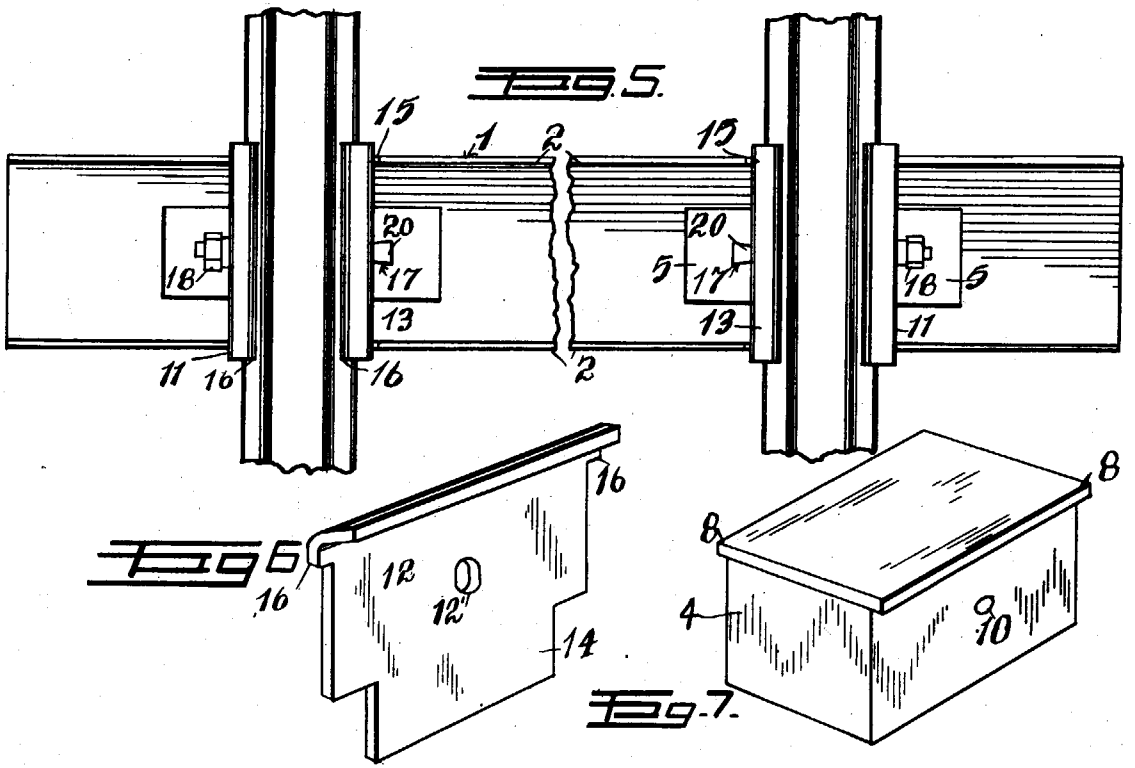
Witnesses
M. C. Taylor.
L. Jordon
Inventors
Burton S. Rupp.
Jesse W. Johnson
By Herrick & Drew
Attorney
COLUMBIA PLANOGRAPH CO., WASHINGTON, D. C.

B. S. RUPP & J. W. JOHNSON.
METALLIC TIE.
APPLICATION FILED MAY 31, 1912.
Reissued May 12, 1914. 13,729.
3 SHEETS—SHEET 3.
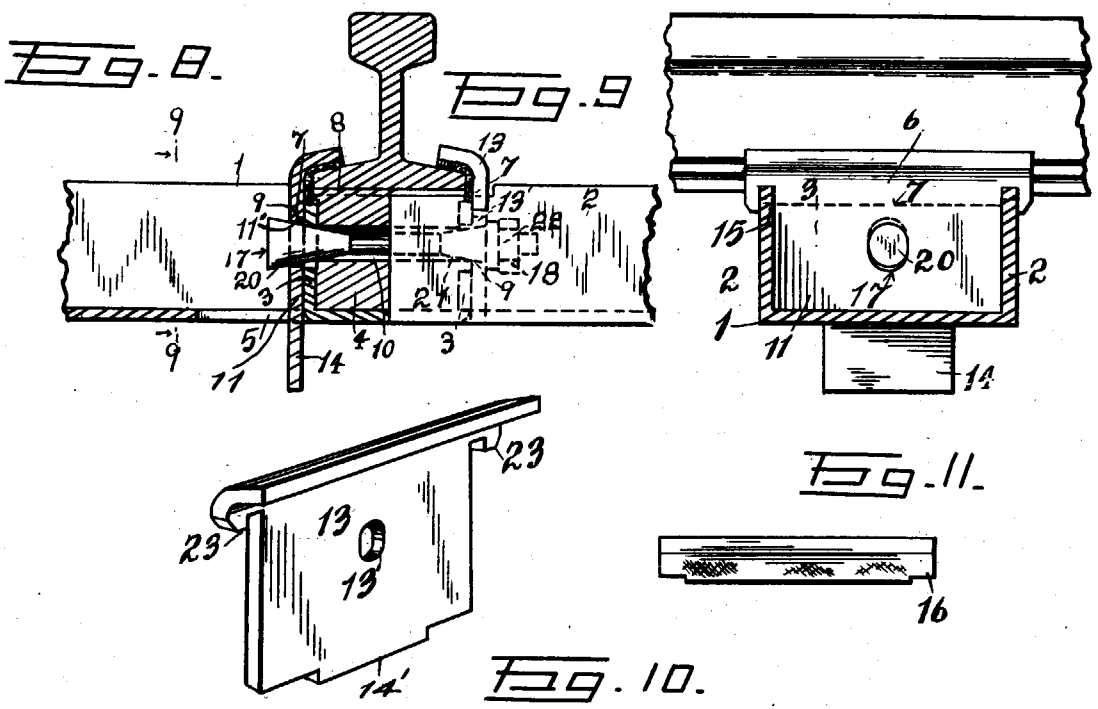
Witnesses
M. C. Taylor.
L. Jordon.
Inventors
Burton S. Rupp
Jesse W. Johnson.
By Hewitt & Dunn
Attorney
COLUMBIA PLANOGRAPH CO., WASHINGTON, D. C.

UNITED STATES PATENT OFFICE.

BURTON S. RUPP AND JESSE W. JOHNSON, OF SALT LAKE CITY, UTAH, ASSIGNORS TO UNIVERSAL METALLIC TIE COMPANY, A CORPORATION OF UTAH.

METALLIC TIE.

13,729. Specification of Reissued Letters Patent. Reissued May 12, 1914.

Original No. 1,005,317, dated October 10, 1911, Serial No. 580,557. Application for reissue filed May 31, 1912. Serial No. 700,858.

*To all whom it may concern:*

Be it known that we, BURTON S. RUPP and JESSE W. JOHNSON, citizens of the United States, residing at Salt Lake City, in the county of Salt Lake and State of Utah, did invent certain new and useful Improvements in Metallic Ties; and it is hereby declared that the following is a full, clear, and exact description of the invention, as will enable others skilled in the art to which it appertains to make and use the same.

The present invention relates to means for holding a rail to a cross tie and has particular reference to means of this character, wherein vertically adjustable clamping plates are provided, in combination with novel means to draw the clamping plates downwardly.

In the practice of the invention we provide a preferably hollow metallic cross-tie, within which is mounted a non-metallic block, which supports the rail. Vertically adjustable clamping plates are arranged upon opposite sides of the rail and are moved downwardly by novel means, including tapered elements which are connected by a common adjustable connecting means. It has been found that the clamping plates with the novel means to draw the same downwardly are particularly well adapted for use in connection with a hollow metallic cross-tie, but it is not desired to restrict the same to this use alone as they may be advantageously employed in connection with any other form of cross-ties, such as concrete, or wooden tie.

The objects of our invention are to provide a railway tie of the class described, which is extremely simple in construction and inexpensive in manufacture, and one which, while comprising a plurality of parts can be readily assembled to clamp the rails in position without the use of the usual spikes.

Another object of our invention is to provide a railway tie having clamping means and bearing blocks which can be readily replaced without the removal of the cross-tie or disturbance of the rails.

Figure 2:
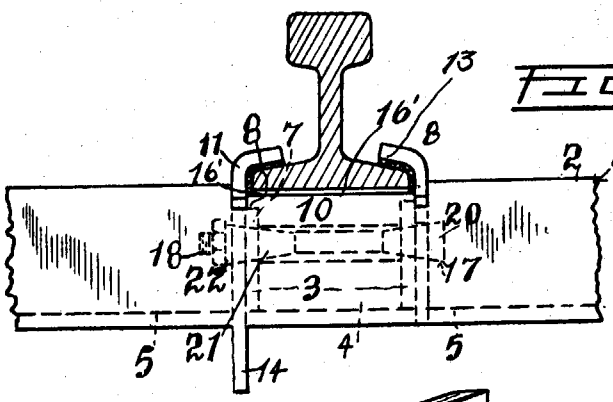
Figure 3:
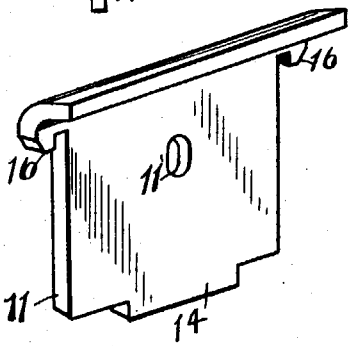
Figure 4:
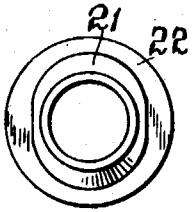

In the accompanying drawings, Figure 1 is a side elevation of one form of our invention, showing the rails in section; Fig. 2 is a perspective view of a clamping plate used on the outside of the rails, Fig. 3 is a sectional view of the coned sleeve used on the locking bolt; Fig. 4 shows an end elevation thereof; Fig. 5 illustrates a top plan view; Fig. 6 shows a perspective view of another form of outside clamping plate; Fig. 7 is a perspective view of the bearing block; Fig. 8 shows a view partly in section and partly in elevation, illustrating the method of securing the clamping plates and the rails to the bearing block; Fig. 9 is a transverse section on line 9—9 of Fig. 8, looking in the direction indicated by the arrows; Fig. 10 shows a perspective view of the inside clamping plate, Fig. 11 is a side elevation of the packing material or wearing plate used between the rails and the bearing blocks.

Referring to the drawings, 1 represents the metallic tie, having the up-turned sides 2, and forming a shell like structure. Stamped from the bottom of the tie are flanges 3 integral therewith and bent up in such manner as to serve for retaining the bearing block 4. This block is preferably of wood and serves to support and cushion the rail. These flanges leave holes, designated at 5, in the bottom of said tie, which holes serve to receive extensions of the clamping plates, as hereinafter described. The flanges 3 and bearing block 4 are provided with holes 9 and 10 respectively for the reception and retention of locking means hereinafter described, the flanges 3 fitting against the sides of the block and their respective holes registering. The upper edges 7 of the flanges terminate just short of the edges or projections 8 at the top of the bearing block.

For securing the rails to the tie and to the bearing blocks, we use the clamping plates 11, 12, and 13 which are provided with openings 11′, 12′, and 13′ respectively, corresponding to the holes 9 and 10 in the flanges and bearing blocks. The outside plate 11 has the extension 14 which fits into the opening 5, and which is embedded in the ground beneath the tie and thus serves to prevent longitudinal movement or creeping thereof. The extension 14′ of the inside clamping plate fits into the opening 5 between the rails and the clamping plate as a whole is held against movement longitudinally of the tie by its engagement against the edges 15. The upper edges of the sides of the tie are cut away where the clamping plates are secured, as indicated at 15, and the extensions 16 of the clamping plate fit therein.

To assemble the several parts of our invention and secure the rail to the tie, the block 4 is placed between the flanges 3 and the wearing plate 16′ is inserted between the rail and the bearing block, as shown in Figs. 1 and 8. Plate 11 is then driven into the ground until the rail is securely fastened to the block and the opening 11′ registers with the holes 9 and 10 of the flanges and bearing block. The bolt 17 is now inserted through the plate, flange and block, and the inside plate 13 is placed in position. The nut 18 is then tightened until the several parts are securely locked together. Bolt 17 is provided with the coned head 20, elliptical in cross section, and the sleeve 21 having the flange 22. The conical portion of the sleeve enters the holes 9 of the flanges, said holes conforming substantially to the shape of the head 20 and sleeve 21, and is prevented from turning therein by the elliptical shape of the sleeve and head.

It will be noted that the clamping plates shown in Figs. 2 and 10 differ slightly from the clamping plate shown in Fig. 6. In these Figs. 2 and 10 the lugs 16 and 23 are provided at the ends of the clamping plate, said lugs being arranged to fit over the sides 2 of the tie. When this form of clamping plate is used, it is not necessary to have the sides 2 cut away as at 15, but ordinarily this may be done regardless of the form of clamping plate used.

From the above it will be seen that we have provided an extremely simple and durable tie and one to which the rails may be fastened without the use of the usual spike. The tie may be readily taken apart to insert new packing material or wearing plates or to replace a worn-out portion. Ordinarily we propose to manufacture our tie of rolled steel, but stamped metal may be used for the several parts.

What we claim is:—

1. The combination with a metallic railway tie, of a non-metallic block for supporting a rail, clamping plates having rail engaging portions, and a clamping bolt extending through the non-metallic block and carrying tapered members to engage the clamping plates.

2. The combination with a metallic railway tie, of a non-metallic block for supporting a rail, a clamping plate having a rail engaging portion and provided with an opening formed therethrough, and a clamping bolt engaging the non-metallic block and having tapered members to engage within the opening of the clamping plate.

3. The combination with clamping plates provided with rail engaging portions and having openings formed therethrough, of a non-metallic block for supporting the rail and disposed between the clamping plates, means to support and hold the non-metallic block in place, tapered elements disposed within the openings of the clamping plates, and means to draw said tapered elements toward each other.

4. The combination with clamping plates provided with rail engaging portions and having openings formed therethrough, of adjustable means to hold the clamping plates in their requisite positions, including relatively movable tapered elements disposed within the openings formed in the clamping plates.

5. The combination with clamping plates provided with rail engaging portions and having openings formed therethrough, of adjustable means to hold the clamping plates in their requisite positions, including relatively movable elements having their lower engaging faces inclined, said movable elements being disposed within the openings of the clamping plates.

6. The combination with a metallic railway tie, of a non-metallic block disposed therein for supporting a rail and provided with an opening formed therethrough, clamping plates disposed upon opposite sides of the non-metallic block, having rail engaging portions and openings formed therethrough, a clamping bolt disposed within the opening of the non-metallic block and carrying a tapered head operating within the opening in one clamping plate, a tapered sleeve adjustably mounted on the clamping bolt and operating in the opening of the other clamping plate, and means to move the tapered sleeve longitudinally of the clamping bolt.

7. The combination with a metallic railway tie, of a non-metallic block disposed therein and provided with an opening formed therethrough, apertured holding plates connected with the metallic railway tie and disposed upon opposite sides of the non-metallic block to prevent its longitudinal movement with relation to said railway tie, apertured clamping plates disposed near the holding plates and provided with rail engaging portions, tapered elements operating within said apertures to draw the clamping plates downwardly upon their longitudinal movement, and means to move the tapered elements longitudinally toward each other.

8. The combination with clamping plates provided near their upper ends with rail engaging portions to clamp against the rail upon the downward movement of said clamping plates, said clamping plates being provided with openings, means to draw said clamping plates downwardly, including tapered elements extending within the openings of the clamping plates, and means to move said tapered elements.

9. A metallic railway tie comprising a body portion, clamping means for the rail, which directly engage the rail and an extension on said clamping means adapted to be embedded in the earth.

10. A metallic railway tie comprising a body portion, clamping means for the rail which directly engage the rail, and an integral extension on said clamping means adapted to be embedded in the earth below the level of said tie.

11. A railway tie comprising a metallic shell of substantially U-shape, a bearing block for the rail and clamping plates provided with inturned upper portions adapted to engage the base flanges of a rail, said clamping plates having downwardly extending lugs adapted to hook over the upper edges of the said metallic shell, and a bolt passing through said clamping plates and through upstanding members of said shell, said bolt having a non-circular head, and a non-circular sleeve slidable thereon, said head and sleeve engaging non-circular openings in said shell.

12. A railway tie comprising a metallic shell of substantially U-shape, a bearing block for the rail, and clamping plates provided with inturned upper portions for engagement with the base flanges of the rail, said clamping plates having downwardly extending lugs adapted to hook over the upper edges of said metallic shell, integral upturned members struck from the bottom of the metallic shell which lie inside and outside of said clamping plates, and a fastening device traversing said bearing block, said upturned members and said clamping plates and holding all of said members together, one of said clamping plates having a downward extensions which projects below the shell for engagement with the ground beneath said shell.

13. Rail holding means, comprising in combination, clamping plates vertically movable with respect to the rail, a transverse bolt, means to hold the bolt against vertical movement with respect to the rail, and tapered elements carried by the bolt and longitudinally movable with relation to each other and adapted to engage with the vertically movable plates to move the same downwardly with relation to the rail.

14. Rail holding means, comprising in combination, clamping plates vertically movable with respect to the rail, a bolt provided with a tapered head adapted to engage with one clamping plate to move the same downwardly with relation to the rail, means to hold the bolt against vertical movement with relation to the rail, and a tapered sleeve longitudinally movably mounted upon the opposite end of the bolt to engage with the other vertically movable plate to move the same downwardly with relation to the rail.

15. The combination with a railway tie, of a rail, vertically movable clamping plates to engage the rail, tapered elements engaging portions of the clamping plates, and common means to move the tapered elements toward each other.

16. The combination with a hollow metallic railway tie, a non-metallic block disposed therein, a rail mounted upon the block, stationary apertured plates connected with the railway tie and disposed upon opposite sides of the block, apertured clamping plates disposed near the stationary plates and adapted to engage said rail, tapered elements disposed within the apertures of the clamping plates and stationary plates, and common adjustable means connecting the tapered elements whereby they may be simultaneously moved to draw the clamping plates downwardly.

BURTON S. RUPP.
JESSE W. JOHNSON.

Witnesses:
MURRAY TAYLOR,
MARY S. NEWELL.

Copies of this patent may be obtained for five cents each, by addressing the "Commissioner of Patents, Washington, D. C."